(12) United States Patent
Behan

(10) Patent No.: US 12,530,626 B2
(45) Date of Patent: Jan. 20, 2026

(54) PRE-PUBLICATION ASSESSMENT OF DIGITAL CONTENT

(71) Applicant: Mustafa Behan, Berlin (DE)

(72) Inventor: Mustafa Behan, Berlin (DE)

( * ) Notice: Subject to any disclaimer, the term of this patent is extended or adjusted under 35 U.S.C. 154(b) by 258 days.

(21) Appl. No.: 18/459,030

(22) Filed: Aug. 30, 2023

(65) Prior Publication Data

US 2025/0077952 A1 Mar. 6, 2025

(51) Int. Cl.
*G06N 20/00* (2019.01)

(52) U.S. Cl.
CPC ................................ *G06N 20/00* (2019.01)

(58) Field of Classification Search
None
See application file for complete search history.

(56) References Cited

U.S. PATENT DOCUMENTS

| | | | |
|---|---|---|---|
| 8,095,441 B2 | 1/2012 | Wu et al. | |
| 11,425,608 B2 | 8/2022 | Wang et al. | |
| 11,640,609 B1 | 5/2023 | Shoumaker et al. | |
| 2012/0131316 A1* | 5/2012 | Mitola, III | G06F 21/57 712/241 |
| 2019/0182252 A1* | 6/2019 | Dandu | H04L 63/0884 |
| 2021/0319240 A1 | 10/2021 | Demir | |
| 2022/0232029 A1 | 7/2022 | Wei | |

OTHER PUBLICATIONS

Chandola, Varun, Arindam Banerjee, and Vipin Kumar. "Anomaly detection: A survey." ACM computing surveys (CSUR) 41, No. 3 (2009): 1-58. (Year: 2009).*
Checco (Checco, Alessandro, Lorenzo Bracciale, Pierpaolo Loreti, Stephen Pinfield, and Giuseppe Bianchi. "AI-assisted peer review." Humanities and social sciences communications 8, No. 1 (2021): 1-11.) (Year: 2021).*
Kolcz, A., and Abdur Chowdhury. "Lexicon randomization for near-duplicate detection with I-Match." The Journal of Supercomputing 45 (2008): 255-276. (Year: 2008).*

(Continued)

*Primary Examiner* — Vincent Gonzales
(74) *Attorney, Agent, or Firm* — Robert L Knechtel

(57) ABSTRACT

Disclosed is a digital content pre-publication assessment approach using online and centralized features to train a machine learning assessment model implemented to assess the validity of certain digital content prior to its publication. The machine learning assessment model generating pre-publication identification of fraudulent digital content based on a relational technology that identifies, compares, and assesses connections between digital content elements (such as time patterns, sentence structure, proximity, characterization similarities, etc.) to build an intelligent assessment tool that identifies singularities and patterns within sets of digital content elements to identify fraudulent sources of digital content. The model creating an assessment of the authenticity of digital content by screening digital content against peer data records, the screening multiplied according to a plurality of iteration steps. Singularities corresponding to linkages may be weighted according to various known fraudulent characteristics. Digital content may comprise reviews generated on consumer sites and/or publicly accessible commentary sites.

16 Claims, 4 Drawing Sheets

(56) References Cited

OTHER PUBLICATIONS

Jia, Zhi-juan, Liang Zhao, and Na Zhou. "The research on fraud group mining which based on social network analysis." In 2017 29th Chinese Control and Decision Conference (CCDC), pp. 2387-2391. IEEE, 2017. (Year: 2017).*
Marchal, Samuel, and Sebastian Szyller. "Detecting organized ecommerce fraud using scalable categorical clustering." In Proceedings of the 35th annual computer security applications conference, pp. 215-228. 2019. (Year: 2019).*
Akoglu, Leman, Rishi Chandy, and Christos Faloutsos. "Opinion fraud detection in online reviews by network effects." In Proceedings of the international AAAI conference on web and social media, vol. 7, No. 1, pp. 2-11. 2013. (Year: 2013).*
Heydari, Atefeh, Mohammad ali Tavakoli, Naomie Salim, and Zahra Heydari. "Detection of review spam: A survey." Expert Systems with Applications 42, No. 7 (2015): 3634-3642. (Year: 2015).*
Santamaria Ruiz and Guzman, fraud detection model based on the discovery symbolic classification rules extracted from a neural network, MICAI 2010, Part ii, LNAI 6438, 2010, pp. 290-302, Springer-Verlag Berlin Heidelberg.

\* cited by examiner

PRE-PUBLICATION ASSESSMENT OF DIGITAL CONTENT

TECHNICAL FIELD

The present disclosure relates to training and using machine learning assessment and decision models that analyze digital content from various origin points to identify fraudulent content prior to its publication.

BACKGROUND

Many online platforms use methods to identify, analyze and remove third-party (e.g., individuals, companies, AI) user generated fake and/or dis-(or mis-) informative digital content (fraudulent digital content). These approaches generally rely on post-publication review for authenticity decisions. Post-publication review does not properly consider the situation that once fraudulent digital content is released, if even for a short period of time, it has still been available for viewing and relied upon by at least some people. Further, post-publication review, due to the nature of the processes, often misses fraudulent digital content, thereby resulting in high percentages of fraudulent information remaining for viewing. Other methods used rely on semantic analysis of digital content that works pre-publication; however, these approaches detect fraudulent content from very simple manipulation schemes. These systems fail to detect content from more complex fraudulent content generation (e.g., conversational AI).

SUMMARY

Various embodiments of the disclosure relate to a machine learning method which may be implemented by a computing system of a data integrity systems operator. The method may comprise generating fraudulent digital content data markers by applying digital content to a model of known peer data points, the relationships between the known peer data points and the digital content to assess the potential for fraudulent digital content. The method may comprise sending the digital content to a machine learning analytical model to generate an authenticity assessment of certain digital content. The machine learning assessment model may have been trained by applying machine learning to analytical models and digital content to synthesize machine learning to understand large sets of digital content.

Various embodiments of the disclosure relate to a machine learning computing system comprising a processor and a memory comprising instructions executable by the processor. The instructions may comprise generating data markers for fraudulent digital content by processing the digital content in a model of known peer data points and identifying the relationships between them and the digital content. The machine learning platform may comprise sending the digital content to a machine learning assessment model to generate an assessment of fraudulent digital content. The machine learning assessment model may have been trained by applying machine learning to digital content and known peer digital content data points.

Various embodiments of the disclosure relate to a machine learning method which may be implemented by a computing system of a data integrity systems operator. The method may comprise generating digital content indicators by identifying singularities to develop known peer data points and apply them to identify and assess fraudulent digital content. The method may comprise sending the digital content to a machine learning assessment model to generate an assessment of fraudulent digital content. The machine learning assessment model may have been trained by applying machine learning to network features and non-network features.

In various example embodiments, the network model may comprise a consumer review. The machine learning platform may define at least one singularity in the consumer review according to at least one of a distance between reviews and time lags between responses setting a fingerprint and identifying patterns between consumer review digital content and known peer digital content data points. The machine learning platform translates each consumer review into a metrical value to identify patterns and similarities within a set of consumer reviews. These patterns are translated into an assessment of similarities to understand common sources of content-which may then be used to identify fraud.

In various example embodiments, the network model may comprise a commentary. The machine learning platform translates each commentary into a metrical value to identify patterns and similarities within a set of commentaries. These patterns are translated into an assessment of similarities to understand common sources of information-which may then be used to identify fraud.

In various example embodiments, the model may comprise a retail online site that displays consumer reviews. The machine learning platform may translate each consumer review into a metrical value to identify patterns and similarities within a set of consumer reviews. These patterns are translated into an assessment of similarities to understand common sources of information-which may then be used to identify fraud.

In various example embodiments, the network model may comprise a publicly available social commentary platform such as a social media platform, a news organization platform and the like. The machine learning platform may translate each social commentary into a metrical value to identify patterns and similarities within a set of social commentary. These patterns may then be translated into an assessment of similarities to understand common sources of information-which may then be used to identify fraud.

In various example embodiments, the model may comprise distance operators. Known data points may comprise distance points for determining distance and/or time between reviews and known peer data points. The machine learning platform may be configured to generate fraudulent digital content data markers by creating data points for combinations of distance operators and comparable known data points.

In various example embodiments, the model may comprise a network corresponding to linkages between known data points. The machine learning platform may translate each linkage into a metrical value to identify patterns and similarities within a set of linkages. These patterns may be translated into an assessment of similarities to understand common sources of information-which may then be used to identify fraud.

Various embodiments of the disclosure relate to a machine learning method implemented by a computing system of a data integrity system operator. The method may train one or more assessment models for assessing digital content to determine its validity prior to its publication. The method may comprise generating a model of known peer data points and correlating relationships between digital content and the known peer data points. The network model may comprise at least one digital content unit (e.g., a consumer review, commentary posting, etc).

Each singularity in the digital content unit may be defined according to at least one of a distance between reviews and time lags between responses to follow-up plausibility questions setting a fingerprint and identifying patterns between generated digital content and known peer digital content data points. The method may comprise generating digital content data points by applying known peer data points to the model. The method may comprise applying machine learning to the known fraudulent peer digital content data points to train a machine learning assessment model configured to generate assessments of fraudulent digital content.

Various embodiments of the disclosure relate to a machine learning method implemented by a computing system for the pre-publication analysis and assessment of digital content, wherein pre-publication digital content is received by a computing system and is verified. A machine learning assessment model using known peer data points as training data is then engaged, the machine learning assessment model trained to generate pre-publication identification of fraudulent digital content. The machine learning assessment model, using the known data points as input to generate an assessment of digital content to determine whether it is fraudulent, the machine learning assessment model comprising a density-based clustering technique that is a function of a density operator. The machine learning assessment model defining each singularity in the network according to at least one of an amount, a frequency, or an incidence of data points between the received digital content and known peer data points. The model comprises distance operators, and wherein generating the peer data records comprises generating, by the computing system, features for combinations of distance operators and distance vectors compatible with corresponding distance operators.

Various embodiments of the disclosure including a machine learning computing system for detection of fraudulent digital content, the computing system comprising a processor and a memory comprising instructions executable by the processor, the instructions comprising a machine learning platform configured to train a machine learning assessment model using known peer data points, in whole or in part, as training data, the machine learning assessment model trained to generate assessments of whether digital content is fraudulent. Execution by the machine learning assessment model using the known peer digital content as input to generate an assessment of whether digital content is fraudulent. The model screening pre-publication digital content at least once for fraudulent data points, wherein the machine learning platform defines each singularity in the digital data according to at least one of a frequency or an incidence of known peer data.

The model including a network corresponding to linkages between known peer data records, including data points, wherein the machine learning platform defines each singularity in the network as indicating a linkage between corresponding tuples of known peer digital content data points and pre-publication digital content, each singularity weighted according to a characteristic of the corresponding linkage.

These and other features are explained in more detail in and will become apparent from the following detailed description and the accompanying drawings.

DETAILED DESCRIPTION

Figure 1:
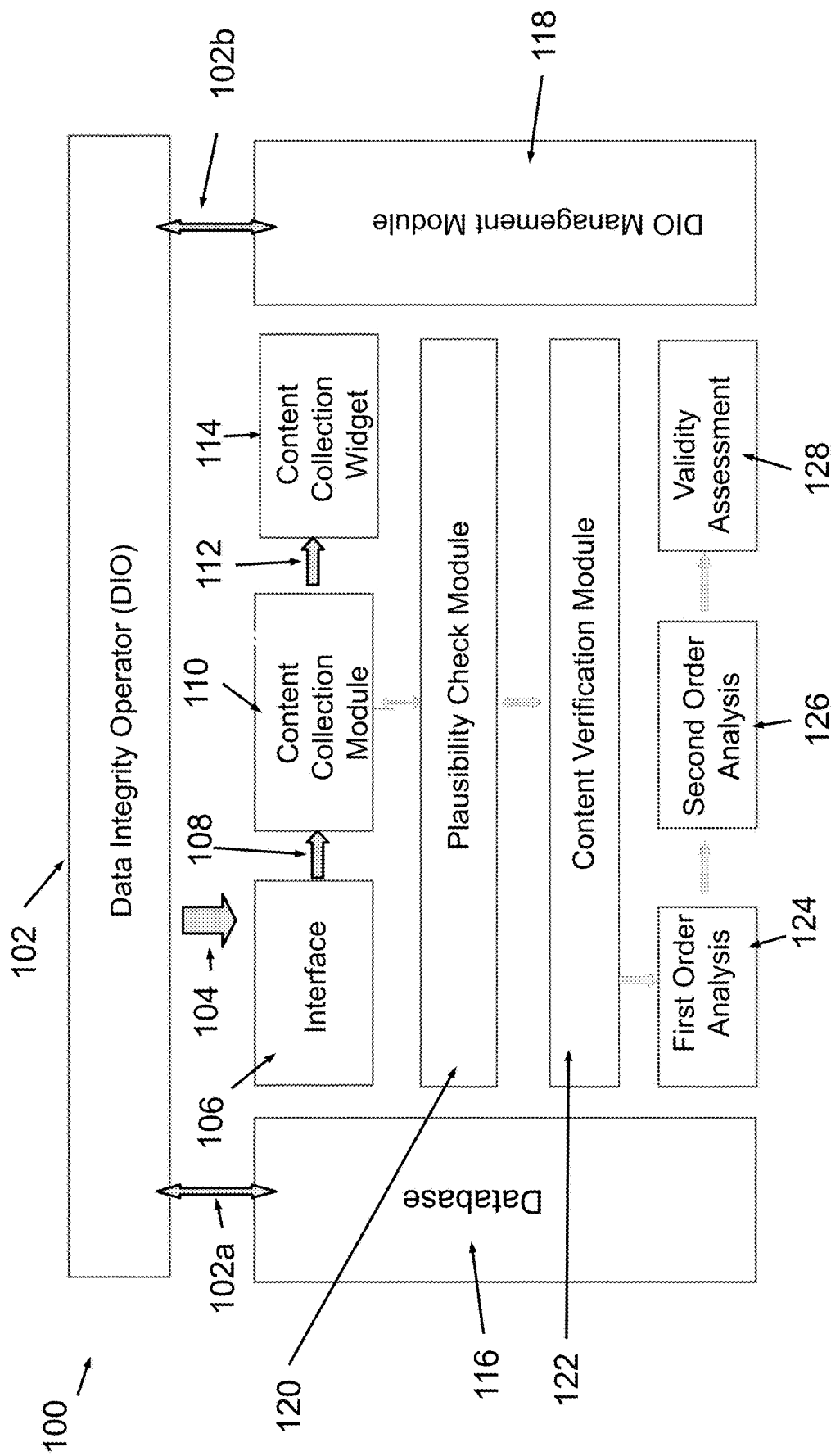
FIG. 1 is a flow diagram of a general overview of the system.

In the various embodiments presented herein, machine learning approaches, which may involve supervised and/or unsupervised learning, may be used for training and implementing assessment machine learning models for detecting fraudulent information or misinformation a/k/a disinformation prior to its publication. Throughout, the term fraudulent digital content includes, without limitation, fake or untruthful information and mis- or dis-information. Fraudulent digital content may, without limitation, arise in the settings of reviews, such as found on shopping, travel, hospitality, and restaurant and restaurant related sites, and commentary, such as publicly accessible news, social media, and politically oriented sites. Throughout digital content includes, without limitation, user and/or machine generated reviews and commentary created for the purpose of publishing on the internet to websites or platforms. Fraudulent digital content may originate from, without limitation, individuals, companies, paid content creators, and/or machine learning/artificial intelligence sources.

A representation of digital content and its relationships to a known peer group of digital content data points can be determined and used to translate identified digital content data points into bench-marking peer data points. Machine learning models may be applied to analyze connections and understand relations between different data points and thereby more effectively and efficiently discover fraudulent digital content prior to its publication.

A machine learning platform trains and uses models to exploit the fact that certain digital content may contain data points that identify them as fraudulent. Each singularity of the digital content may be defined as containing a linkage between known fraudulent data points which, in turn, may be weighted according to one or more characteristics of the known peer group data points. A singularity indicating a linkage between corresponding tuples of known peer digital content data points and pre-publication digital content, wherein the computing system defines each singularity as denoting a linkage between corresponding tuples, pairs are sets of two, n-tuples are set of n elements of digital content, and each singularity weighted according to a characteristic of the corresponding digital content. The method may comprise generating fraudulent data points by applying known peer data points to the model. The method may comprise applying machine learning to the known peer group data points to train a machine learning assessment model configured to generate assessments of fraudulent digital content, and which may be described by distance operators.

In various example embodiments, the method may comprise comparing digital content data points corresponding to known peer group data points to generate an assessment of fraudulent digital content. This process is undertaken after the time of digital content creation but before a potential publication.

The model may comprise curved-space distance operators. Unlike orthogonal matrices which generate results based only on angled vectors of 90 degrees thus creating a square matrix used to represent a finite graph, the herein developed and applied distance operators enable a broader scope of activity by enabling a curved inclusion area, thereby offering the opportunity for additional data point recognition. The use of these distance operators further enhances the ability to interpret digital content data points using multiple peer data points and known fraudulent data points. The known fraudulent data points may comprise codifying from combinations of distance operators and corresponding known peer group data points to identify similarities in certain digital content.

The machine learning platform may employ a variety of machine learning techniques in classification and pattern recognition of digital data points to determine "organic" (as opposed to "fabricated") patterns in data and to identify unusual outlier data points.

Fraudulent digital content is often not discoverable through analyzing the individual digital content in isolation, but through data point relationships and linkages with peer group data points. Whether the peer group data points are fraudulent or not is immaterial; the pattern/distance between data points provides the necessary information to make an assessment. Certain activities may disguise fraudulent digital content unless the activities are placed in the context of known peer group data points with some identifiable association which may, in isolation, seem normal. The disclosed approach thus enables the discovery and prevention of fraudulent digital content that could not otherwise be discovered prior to publication through conventional means. Further, the disclosed approach reveals relevant connections within digital content not feasibly discoverable by human users. Training an assessment model using a combination of network-based and other features as disclosed herein places the digital content in context rather than being considered in isolation, thereby yielding accurate assessments.

Example embodiments of the machine learning model described herein improve computer-related technology by performing functions that cannot be carried out by conventional computing systems. Furthermore, the embodiments described herein cannot be carried out by humans. The machine learning model may proactively compare digital content corresponding to known peer group data points and known fraudulent data points to identify fraudulent digital content that would otherwise go undetected. Conventional systems may include databases and definitions that are static and cannot be configured to acquire, store, and update the multitude of information required from identifying peer group data points and known fraudulent data points.

Referring to FIG. 1, a flow diagram illustrating the basic movement of digital content through the inventive system 100 is shown, according to potential embodiments.

The system 100 includes a platform computing system 102, here a data integrity operator (DIO). A DIO may be defined as a centralized server that houses peer group data points in a Database 116. The platform computing system 102 may be that of an online provider of goods or services or a platform that accepts user created digital content. For example, many online platforms accept user-created digital content in the form of reviews of goods or services, such as online shopping platforms, travel related platforms, restaurants and restaurant related platforms, and the like. Other platforms accept user created commentary, such as news organizations, social media platforms, political platforms, and the like. While the DIO may comprise an online platform such as a retailer or news organization, various embodiments contemplate centralized servers that house peer group data points, such as a server farm. The DIO 102 further comprises memory hosting a database 116 for housing the data points and a DIO Management Module 118 for operating the system. Database 116 and Management Module 118 communicate with DIO 102 at communication points 102a and 102b, respectively.

The component parts of the system 100 may be integrated or operatively coupled to one another directly or over a network that permits the exchange of data and the like. System 100 may include one or more processors, memories, network interfaces, and user interfaces. The memory may also store data points in database 116. Interface 106 allows system 100 to communicate 104 with DIO 102, when operatively coupled, by sending and receiving transmissions via one or more communications protocols.

Once a platform computing system 102 communicates 104 at Interface 106, the digital content submission and analysis process is initiated by the computing system. Review Collection Module 110 organizes the way users can submit reviews and plausibility check 120 is initiated wherein information is collected, such as, but not limited to, time of submission, IP address, email address, topic of digital content, keywords, etc. Simultaneously or later, Review Collection Module 110 and then may send 112 digital content to Review Collection Widget 114. Review Collection Widget 114 comprises a link or a link on the Website of the platform 102 to signal to users that they can place/submit their digital content here. The plausibility check 120 is an order check of the digital content itself, without comparison to any other content or data point. The plausibility check may happen through an email that asks plausibility questions regarding the digital content submission. The computing system may then check between what is written in the review and the answers of the plausibility question answers. Plausibility is determined by analyzing basic features of the digital content such as consistency in subject, email address, etc. A digital content submission may fall out or move on further in the analysis process. In either event, verification check 122 is initiated. For reviews that are disqualified in the plausibility check, data points are collected and stored in data base 116 and made accessible to the machine learning system for training and that can be used to better understand better how fraudulent content looks. Subsequent content items may then be compared to disqualified items and their characteristics. Verification checks are well known in the industry. Digital content is verified by (1) identifying the IP address of the digital content and, following, (2) sending a verification to the sender asking about the digital content. Verification is generally done via email but may be done through any system, such as text, DM, or telephone.

The present invention places metrics onto data points that until now have normally not had metrics. Digital content features such as word structure, sentence structure, proximity checks, characterization similarities, among other digital content features along with time lags (time patterns) are recorded and analyzed in combination with and against one another to locate patterns in digital content that identify fraudulent digital content. For non-limiting example, if multiple digital content units are received, all having the same or similar time lags sentence structure, suspicion is raised about the validity of the digital content. Even if time lags are varied, patterns emerge that signal potential fraudulent digital content which the machine learning computing system can detect and store for future digital content analysis. This true for all features in isolation or in combination. It is for this reason that the present invention works particularly well in identifying fraudulent digital content generated by artificial intelligence platforms.

Once the first plausibility check is completed, a first order analysis 124 is performed by the model wherein data points for each digital content are codified and then, using the different known peer group data points compared to other known peer group data points for plausibility of the digital content through measurement of the distance between other comparable digital content—and consistency within the verification. A probability of valid digital content is determined by measuring the distance of data points against known peer group data points. Through multiple iterations, at least two but that may number up to 70 or more, further determination can be made.

Further analysis is initiated by the model in a second order analysis 126 wherein measurement may identify patterns between groups of digital content. The second order analysis may look at any forms of patterns, be it in time, text, etc. For example, a machine that writes content would create patterns that could be identified. Such analysis is not easy to identify in one single piece of content, but by looking at patterns in the peer group. Again, the second order analysis is performed through multiple iterations numbering up to 70 or more.

The outcome of the analysis is then weighted against known peer group data points to make an assessment 128 of the validity of the digital content. The machine learning model of the present invention is premised on the hypothesis that:
 i) fraudulent digital content is fabricated, (ii) the source of fraudulent digital content is often originally the same, (iii) a common source leaves traces in characteristics in the digital content; and, (iv) assessment of the probability of fraud can be accomplished by detecting traces for a common source of the reviews in question.

With the above as a basis, the machine learning model of the present invention includes the following protocols:
 1. Digital Content collection process: Process to collect digital content in a way that (i) ensures a high likelihood of authenticity at the collection stage and (ii) generation of an array of characteristics for each digital content;
 2. Initial Assessment of Authenticity: Identification of red flags or white flags connected with the digital content, including:
    (I) history of reviewed vendor, product or service and
    (ii) history of digital content creator;
 3. Measuring Characteristics of the digital content in Question: Isolate and classify single characteristics and establish a metric operator for the each of the single characteristics;
 4. Classify the Intrinsic Authenticity of each new Single Digital Content: Identify intrinsic characteristics of each digital content to obtain a first estimate of authenticity and decide for specific modules of analysis to be used.
 5. Measuring the Distance between the Digital Content in Question and other comparable Digital Content: Calculate and normalize the distance between single digital content within a given population to identify patterns between digital content data points;
 6. Assess the Authenticity of the new incoming Single Digital Content: Combine the intrinsic plausibility of the single digital content with the distance assessment of other digital content in order to make an assessment of authenticity of digital content data points;
 7. Deploy Machine Learning Techniques for Optimizing Accuracy: Increase the accuracy of the analysis of digital content by fortifying digital content trust points and identifying single distance patterns between digital content as suspicious.

Figure 2:
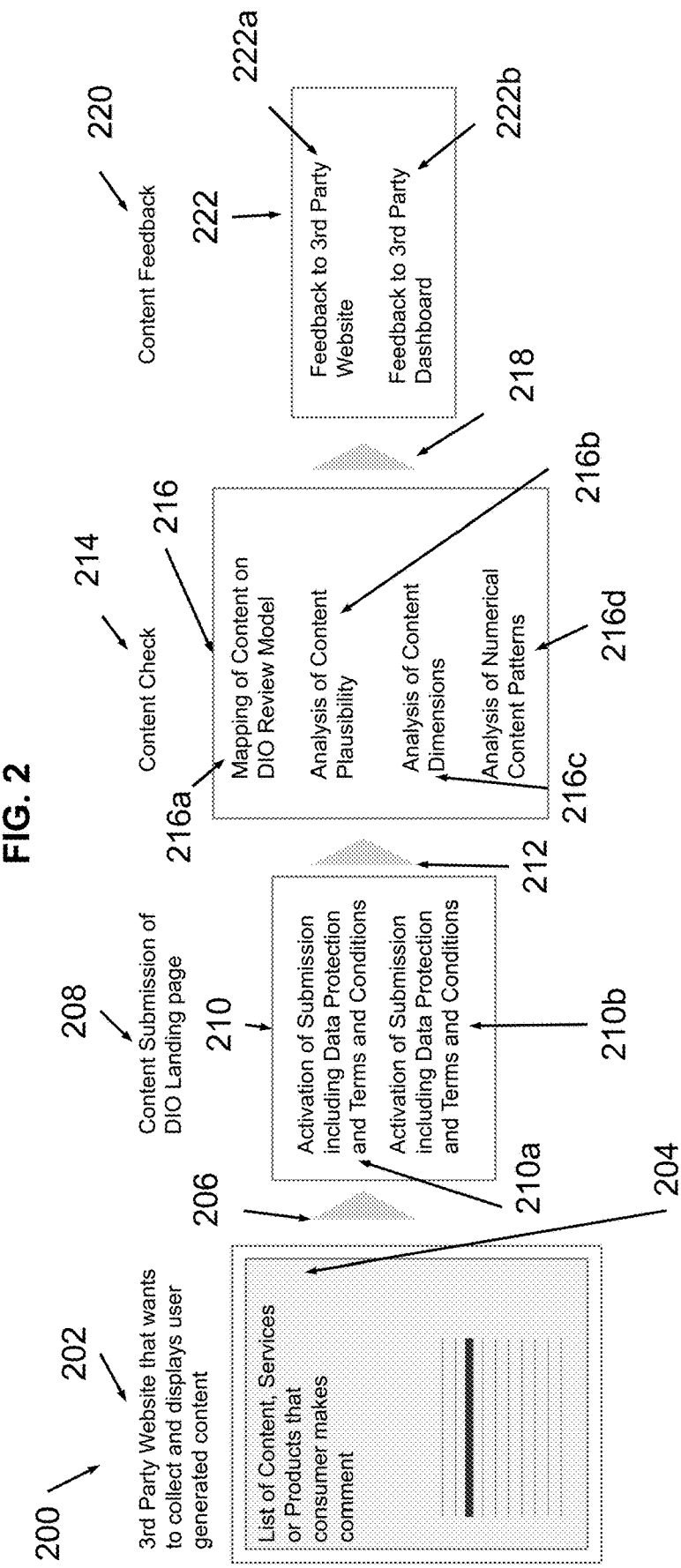
FIG. 2 is a block diagram of a data integrity system operator computing system that implements a machine learning platform and that communicates with third-party platforms.

Turning to FIG. 2, is a depiction of a system 200 flow example of a DIO working with a third party site that displays user content via a UI website. Third party 202 can be any site or platform that displays user-generated digital content. Common sites include retailers, hospitality providers, travel sites, aggregation sites, news, social media, political sites, and others. These sites may provide specific locations for user created digital content (e.g., retail shopping sites enabling reviews of products) or may be designed to generally accept comment (e.g., social media platforms) 204. Third party 202 contacts 206 DIO website through its landing page 208. Third party 202 interfaces DIO through a UI wherein it signs up with DIO and submits digital content criteria, among other things 210*a*. Once a digital content submission is verified and activated 210B, third party 202 sends DIO digital content for analysis 214 using the machine learning model 216. Mapping of third party digital content 216*a* is performed by the model using DIO's data point data base as implemented by a computing system employing the machine learning model, including plausibility analysis 216*b*, first order analysis 216*d* and second order analysis 216*d*, as discussed above, is performed by the computing system (see discussion above, FIG. 1). A determination is made as to whether the digital content is fraudulent 216*d*. The determination is then transmitted 218 to the third party 202 as feedback 220, 222 through third party's website and then to DIO dedicated dashboard 222*b*. Third party retrieves the feedback from its dashboard and makes an internal decision or use the proposed decision developed by the computing system whether to publish the digital content.

Figure 3:
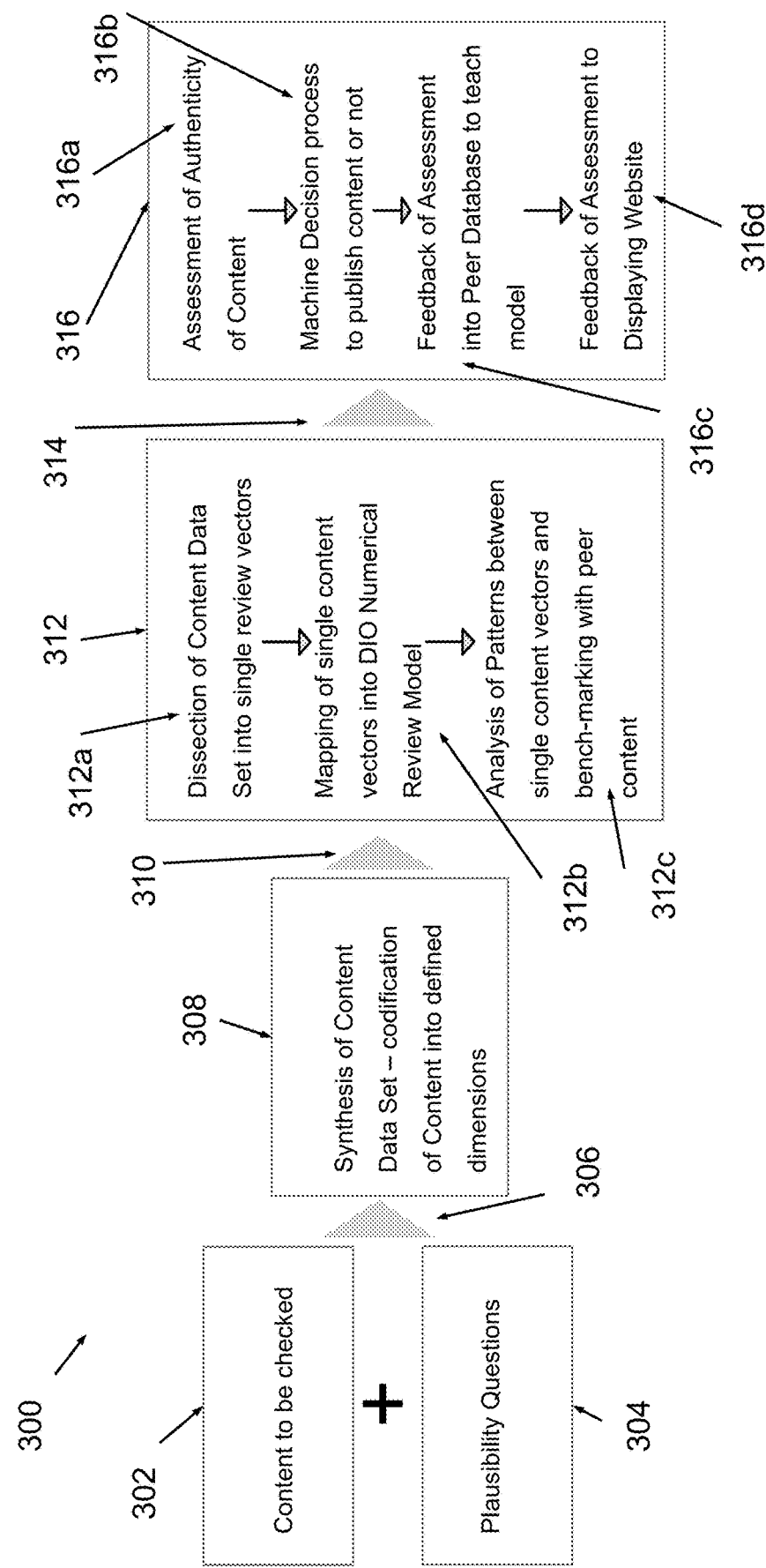
FIG. 3 is a process flow diagram for a machine learning approach to detecting fraudulent digital content.

Turning to FIG. 3, a process flow diagram for a machine learning approach to detecting fraudulent digital content is depicted. Machine learning system 300 obtains content to be checked 302 and performs a plausibility check 304, as discussed above in reference to FIG. 1, of the digital content. The digital content is passed 306 for digital content synthesis 308 wherein digital content is codified into defined dimensions for further analysis. Machine learning system 300 then transfers 310 synthesized digital content for dissection and mapping 312. Digital content is dissected 312*a* into single review vectors, i.e., data points. Thereafter, the single review vectors are mapped against DIO numerical review model 312*b*, i.e., known peer group data points for analysis 312*c* of patterns between single digital content vectors to benchmark then with known peer group content. Once pattern and bench-marking analysis is complete, machine learning system 300 then analyzes the result 316 and makes an assessment as to the authenticity of the digital content 316*a* and a determination of whether the digital content should be published 316*b*.

Thereafter, machine learning system 300 provides feedback of the assessment to the peer group database to train the model 316*c* while also providing feedback to the requesting website 316*d*.

Figure 4:
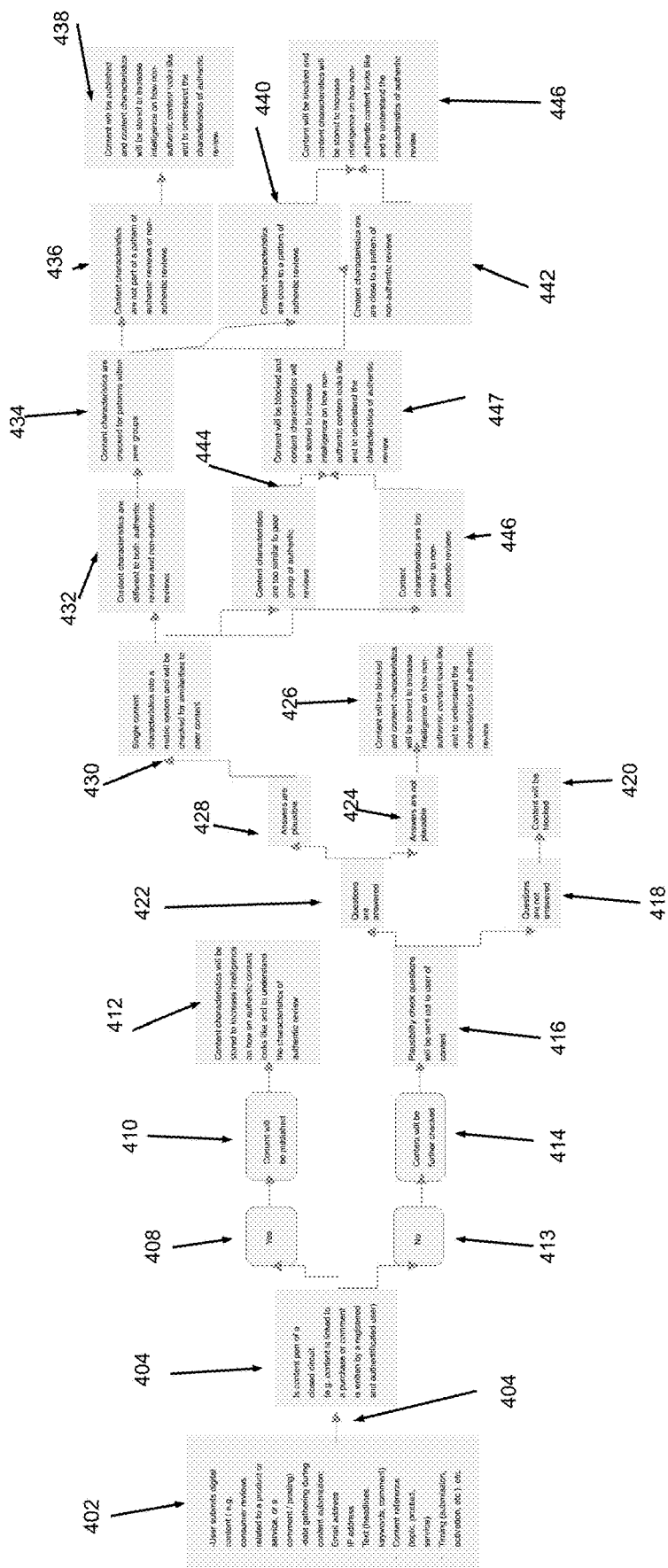
FIG. 4 is a decision tree diagram illustrating the steps of digital content analysis.

Turning to FIG. 4, an example decision tree of the machine learning model is illustrated. At 402, a user submits digital content for potential publication. Certain information is collected by the model. This may be an email address, IP address, text (which may include keywords, titles, product or service identifier, etc.). Initial analysis is performed at 404 to determine whether the submission comes from a verified user. If so 408, digital content is published 410 and content characteristics are stored within the database 116 (FIG. 1) for machine learning model learning purposes and later analysis integration 412. If digital content is not from a verified user 413, it will undergo further analysis 414 as described above. Plausibility questions will be sent to the user 416. If plausibility questions are not answered 418, digital content will be blocked. Since no answers were provided to plausibility questions, content characterizations will not be saved. If plausibility questions are answered 422, then an analysis is done by the computing system to determine whether the provided answers are plausible. If not 424, digital content will be blocked, and content characteristics will be stored within the database 116 (FIG. 1) for machine learning model learning purposes and later analysis integration 426. If digital content is plausible 428, it undergoes further analysis 430 where content characteristics are made into data points and checked against known peer group data points, i.e., first order analysis.

If digital content characteristics (data points) are similar to peer group authentic review known data points 444 or to known fraudulent digital content data points 446, digital content will be blocked, and content characteristics will be stored within the database 116 (FIG. 1) for machine learning model learning purposes and later analysis integration 447. In the case that digital content data points are different from authentic known peer group data points and known fraudulent data points 432, the digital content data points are further checked for content characteristics within known peer groups 434, i.e., second order analysis. If digital content characteristics are not part of a pattern of authentic or fraudulent digital content peer groups 436, it will be published 438 and content characteristics will be stored within the database 116 (FIG. 1) for machine learning model learning purposes and later analysis integration. In the cases where digital content data point characteristics are close to a pattern of known authentic data points 440 or known fraudulent digital content data points 442, digital content will be blocked, and content characteristics will be stored within the database 116 (FIG. 1) for machine learning model learning purposes and later analysis integration 446.

At machine learning process steps 432, 434, multiple iterations are undertaken. Typically, there are between 70 and 200 data points per peer digital content. Each new submission adds to that count and each new submission is reviewed against all known group peer reviews. Thus, each new digital content submission may be analyzed at each of these two steps between 70 and 200 times multiplied by the number of reviews in the peer group. Though the range of 70 to 200 is typical, it is not meant to be limiting.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications.

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the drawings herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A computer-implemented machine learning method for pre-publication assessment of fraudulent digital consumer reviews in an electronic content publishing system, the method comprising:

receiving, by a computing system comprising one or more processors and a memory storing executable instructions, pre-publication digital consumer reviews submitted for publication to a network-accessible content platform;

verifying the digital consumer reviews by:
- (i) capturing a plurality of relevant dimensions of the digital consumer reviews according to a predefined protocol for digital content capture;
- (ii) converting the captured digital content into structured data;
- (iii) generating an initial authenticity assessment of the structured data;
- (iv) translating the structured data into a plurality of characteristic parameters;
- (v) performing an intrinsic authenticity analysis of the digital content based on the characteristic parameters;
- (vi) performing a metrical analysis using distance operators of distances between the digital content and previously stored digital content in a database to simulate a network of content after adding the digital content to the network by checking the distances between all datapoints in the network that would be established after adding the new datapoint;
- (vii) applying one or more distance operators to the computed distances;
- (viii) generating an authenticity decision for the digital content; and
- (ix) updating a machine learning system with the authenticity decision for use in subsequent analyses of future digital content;

training, by the computing system, a machine learning assessment model using known peer group data points as training data, the machine learning assessment model configured to perform pre-publication identification of fraudulent consumer reviews;

generating, by the computing system, based on a plurality of data records accessed from an electronic database, a fraud-detection model comprising a set of patterns and relationships among the known peer group data points that are indicative of fraudulent digital content;

retrieving, by the computing system, from the electronic database, a plurality of the known peer group data points;

generating, by the computing system, an assessment analysis of the digital content by screening the digital content against the retrieved peer group data points, the screening being performed over a plurality of iteration steps;

executing, by the computing system, the machine learning assessment model using the known peer group data points as input to produce an assessment of whether the consumer review is fraudulent, wherein the machine learning assessment model comprises a density-based clustering technique defined by a density parameter; and generating, by the computing system, an indicator marking the digital content as fraudulent in response to the assessment indicating fraudulent content, wherein the indicator is automatically applied by the content publishing system to prevent publication of the fraudulent digital consumer reviews and to reduce false-positive consumer review blocking, thereby improving accuracy and efficiency of automated consumer review moderation on the network.

2. The method of claim 1, wherein the predefined protocol for digital content capture comprises extracting at least one of: textual features, metadata attributes, embedded file signatures, pixel intensity histograms, or compression artifacts.

3. The method of claim 1, wherein translating the structured data into the plurality of characteristic parameters comprises computing a feature vector including at least one of: temporal posting patterns, author identity confidence scores, semantic similarity metrics, or cryptographic hash variance.

4. The method of claim 1, wherein the one or more distance operators comprise normalization functions that scale computed distances into a probabilistic authenticity score.

5. The method of claim 4, wherein the density parameter of the density-based clustering technique is dynamically adjusted based on at least one of: average distance between cluster points, variance in content similarity scores, or number of connected components in the network.

6. The method of claim 1, wherein training the machine learning assessment model comprises performing distributed training across a plurality of GPU-enabled computing nodes.

7. The method of claim 1, wherein generating the indicator marking the digital content as fraudulent further comprises embedding the indicator as a machine-readable tag in the metadata of the content.

8. A computing system for pre-publication assessment of fraudulent digital consumer reviews in an electronic publishing system, the system comprising:
- one or more processors; and
- a memory storing executable instructions that, when executed by the one or more processors, verifies the digital consumer reviews by:
  - (i) capturing a plurality of relevant dimensions of digital content of the consumer review according to a predefined protocol for digital capture;
  - (ii) converting the captured digital content into structured data;
  - (iii) generating an initial authenticity assessment of the structured data;
  - (iv) translating the structured data into a plurality of characteristic parameters;
  - (v) performing an intrinsic authenticity analysis of the digital content based on the characteristic parameters;
  - (vi) performing a metrical analysis using distance operators of distances between the digital content and previously stored digital content in a database to simulate a network of content after adding the digital content to the network by checking the distances between all datapoints in the network that would be established after adding the new datapoint;
  - (vii) applying one or more distance operators to the computed distances;
  - (viii) generating an authenticity decision for the digital content; and
  - (ix) updating a machine learning system with the authenticity decision for use in subsequent analyses of future digital content;
- training, by the computing system, a machine learning assessment model using known peer group data points as training data, the machine learning assessment model configured to perform pre-publication identification of fraudulent digital content;
- generating, by the computing system, based on a plurality of data records accessed from an electronic database, a fraud-detection model comprising a set of patterns and relationships among the known peer group data points that are indicative of fraudulent digital content;

retrieving, by the computing system, from the electronic database, a plurality of the known peer group data points;

generating, by the computing system, an assessment analysis of the digital content by screening the digital content against the retrieved peer group data points, the screening being performed over a plurality of iteration steps;

executing, by the computing system, the machine learning assessment model using the known peer group data points as input to produce an assessment of whether the digital content is fraudulent, wherein the machine learning assessment model comprises a density-based clustering technique defined by a density parameter; and generating, by the computing system, an indicator marking the digital content as fraudulent in response to the assessment indicating fraudulent content, wherein the indicator is automatically applied by the content publishing system to prevent publication of the fraudulent digital consumer reviews and to reduce false-positive content blocking, thereby improving accuracy and efficiency of automated content moderation on the network.

9. The system of claim 8, wherein the predefined protocol for digital content capture comprises extracting at least one of: textual features, metadata attributes, embedded file signatures, pixel intensity histograms, or compression artifacts.

10. The system of claim 9, wherein the density parameter of the density-based clustering technique is dynamically adjusted based on at least one of: average distance between cluster points, variance in content similarity scores, or number of connected components in the network.

11. A non-transitory computer-readable medium storing instructions that, when executed by one or more processors of a computing system, cause the computing system to verify digital consumer reviews by:
(i) capturing a plurality of relevant dimensions of the digital consumer reviews according to a predefined protocol for digital content capture;
(ii) converting the captured digital content into structured data;
(iii) generating an initial authenticity assessment of the structured data;
(iv) translating the structured data into a plurality of characteristic parameters;
(v) performing an intrinsic authenticity analysis of the digital content based on the characteristic parameters;
(vi) performing a metrical analysis using distance operators of distances between the digital content and previously stored digital content in a database to simulate a network of content after adding the digital content to the network by checking the distances between all datapoints in the network that would be established after adding the new datapoint;
(vii) applying one or more distance operators to the computed distances;
(viii) generating an authenticity decision for the digital content; and
(ix) updating a machine learning system with the authenticity decision for use in subsequent analyses of future digital content;

training, by the computing system, a machine learning assessment model using known peer group data points as training data, the machine learning assessment model configured to perform pre-publication identification of fraudulent digital consumer reviews;

generating, by the computing system, based on a plurality of data records accessed from an electronic database, a fraud-detection model comprising a set of patterns and relationships among the known peer group data points that are indicative of fraudulent digital consumer reviews;

retrieving, by the computing system, from the electronic database, a plurality of the known peer group data points;

generating, by the computing system, an assessment analysis of the digital consumer review by screening the digital content against the retrieved peer group data points, the screening being performed over a plurality of iteration steps;

executing, by the computing system, the machine learning assessment model using the known peer group data points as input to produce an assessment of whether the digital consumer review is fraudulent, wherein the machine learning assessment model comprises a density-based clustering technique defined by a density parameter; and generating, by the computing system, an indicator marking the digital content as fraudulent in response to the assessment indicating fraudulent content, wherein execution of the instructions further causes the computing system to automatically apply the indicator to prevent publication of fraudulent digital consumer reviews and to reduce false-positive content blocking, thereby improving accuracy and efficiency of automated content moderation on the network.

12. The non-transitory computer-readable medium of claim 11, wherein the instructions cause the computing system to compute a feature vector including at least one of: temporal posting patterns, author identity confidence scores, semantic similarity metrics, or cryptographic hash variance.

13. The non-transitory computer-readable medium of claim 12, wherein the instructions cause the computing system to dynamically adjust a density parameter based on at least one of: average distance between cluster points, variance in content similarity scores, or number of connected components in the network.

14. The method of claim 11, wherein preprocessing of the digital content prior to verification comprises applying at least one of: natural language processing tokenization, language translation into a canonical form, image resolution normalization, or audio frequency spectrum smoothing.

15. The method of claim 11, wherein the computing system further comprises a fraud detection dashboard configured to display the authenticity decision and supporting metrics.

16. The method of claim 11, wherein the plurality of iteration steps in screening the digital content comprises performing progressive filtering using increasingly strict similarity thresholds.

\* \* \* \* \*